UNITED STATES PATENT OFFICE

THOMAS A. CASSIDY, OF BROOKLYN, NEW YORK, ASSIGNOR, BY MESNE ASSIGNMENTS, TO FRANK J. BUSSER, OF PHILADELPHIA, PENNSYLVANIA, AND HENRY T. HORNIDGE, OF NEW YORK, N. Y., TRUSTEES

HETEROCYCLIC NITROGEN COMPOUNDS SOLUBLE IN ALIPHATIC AND AROMATIC HYDROCARBONS AND TO THE PROCESS OF PRODUCING THE SAME

No Drawing.  Application filed February 19, 1930. Serial No. 429,829.

This invention relates broadly to heterocyclic nitrogen compounds that are soluble in aliphatic and aromatic hydrocarbons and will produce fluorescence, and to the combination of such a heterocyclic nitrogen compound with a liquid hydrocarbon.

Specifically my invention relates to the combination of a napthenic acid salt of a color base, such as an acridine color base, that is soluble in aliphatic and aromatic hydrocarbons, with a liquid hydrocarbon.

It has been known for some time that certain organic compounds have the property of exhibiting fluorescence when dissolved in suitable solvents. The number of such compounds that exhibit fluorescence in alcohol or water is fairly large, and comprises members of the azine, acridine, oxazine and xanthone series. However, it is a peculiar property of such of those compounds that are solvent in liquid hydrocarbons that when dissolved in such a solvent the fluorescence is absent.

In my search for compounds that are solvent in liquid hydrocarbons—that is, aliphatic and aromatic hydrocarbons—I have found that such compounds are limited to a few members of the acridine, azine and oxazine series.

Although isolated examples of materials that are fluorescent in organic solvents are found in other classes such as Furans and polycyclid hydrocarbons, their fluorescence is so slight as not to make them adaptable for commercial use.

In obtaining a compound from the selected classes, i. e., acridine, azine and oxazine, I have found that the amines, whether primary, secondary or tertiary furnished suitable raw material. These compounds in their basic condition are not only solvent in aliphatic and/or aromatic hydrocarbons but they also exhibit an appreciable fluorescence. I have further found that their organic acid salts such as naphthenates, benzoates, salicylates, napthoates, etc. possess increased solubility and enhanced fluorescence, and that the incorporation of a metal soap such as an aluminum palmitate has the property of stabilizing the sol of the salts when dissolved in organic solvents.

As an illustration, an organic acid salt that is soluble in aliphatic and aromatic hydrocarbons and that will produce a pronounced fluorescence may be produced as follows:

*Example 1.*—One part of 3:6 tetramethyl diamino-9-phenyl acridine (known as acridine orange base) which is represented structurally as follows:

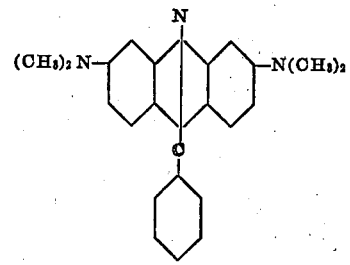

and ten parts of naphthenic acid represented by the formula $$C_nH_{2n-1}(COOH)$$

are heated together to 120° C. for a period of about five hours. The product produced by the reaction, the equation of which may be expressed as follows:

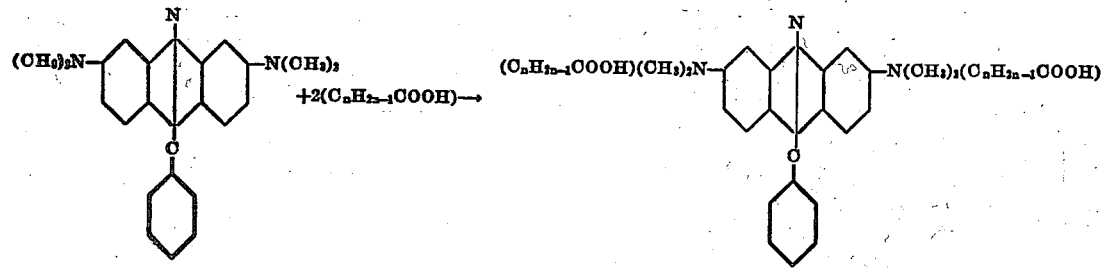

is a naphthenate of acridine orange, a thick viscous liquid of a deep orange brown color that is soluble in aromatic and aliphatic hydrocarbons. This product may be diluted by grinding the same with fifty grams of heavy petroleum oil such as Nujol, and it is then heated in a boiling water bath for one-half hour with vigorous agitation.

*Example 2.*—One part of 3:6:13 hexamethyl triamino-9-phenyl-10-methyl acridine (known as phosphine M base) which is represented structurally as follows:

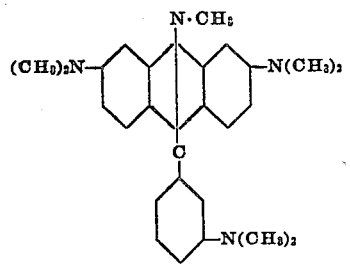

and ten parts of naphthenic acid represented by the formula $$C_nH_{2n-1}(COOH)$$

are heated together to 120° C. for a period of about five hours. The product produced by the reaction, the equation of which may be expressed as follows:

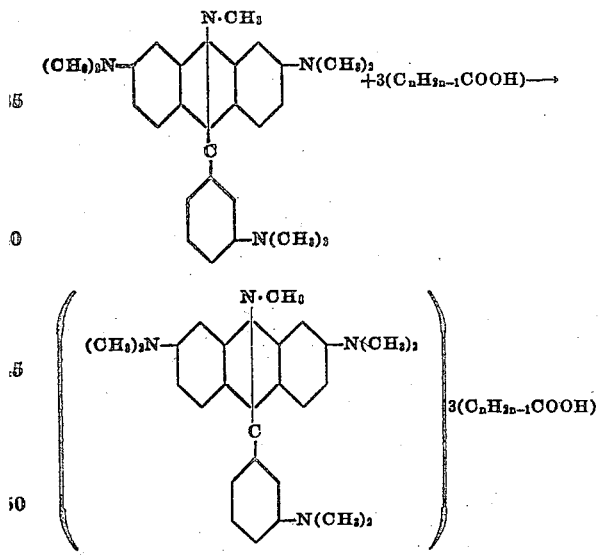

is a naphthenate of phosphine M, a thick viscous liquid of deep orange brown color that is soluble in aliphatic and aromatic hydrocarbons. This product may likewise be diluted by grinding the same with fifty grams of heavy petroleum oil such as Nujol, and it is then heated in a boiling water bath for one-half an hour with vigorous agitation.

The above mentioned products when dissolved in aliphatic and aromatic hydrocarbons not only impart a color thereto but also produce a pronounced fluorescence. These products, therefore, as well as other heterocyclic nitrogen compounds embraced within the scope of my invention, are of great commercial value and utility in that they may be used not only for the purpose of giving a color to gasoline and to lubricating oils but primarily for the purpose of imparting a fluorescence thereto.

When such compounds are used for the purposes above mentioned the color and fluorescence imparted to gasoline or to lubricating oil will depend upon the proportions used, but the desired effect will be secured if not less than .001 of 1% and not more than .01 or 1% be used with the gasoline or lubricating oil.

Not only are the compounds embraced within the scope of my invention non-deleterious but they are exceedingly useful and are of great commercial value in that the color and fluorescence imparted to gasoline or to lubricating oil not only improve the appearance of the gasoline or lubricating oil but they also produce distinctive characteristics whereby the gasoline or oil may be readily recognized as the product of some certain manufacturer or distributor thereby preventing fraudulent substitution of an inferior gasoline or oil therefor.

In giving the above mentioned examples it is to be understood that I do not restrict myself to the naphthenate of the specific color base herein mentioned for my invention comprehends the color bases of other series which are soluble in hydrocarbons and impart a pronounced fluorescence thereto.

What I claim is:—

1. The process which consists in heating a mixture of naphthenic acid and acridine orange base and then diluting the same with a petroleum hydrocarbon in the presence of heat and vigorous agitation.

2. The process which consists in heating 10 parts of naphthenic acid and 1 part of acridine orange base to 120° C. for a period of about five hours, and then diluting the same with a petroleum hydrocarbon in the presence of heat and vigorous agitation.

3. The combination of an aliphatic hydrocarbon with a napthenate of acridine orange that is soluble therein and that will impart a pronounced fluorescene thereto.

4. The product with comprises in combination an aliphatic hydrocarbon and a naphthenate of an acridine color base that is soluble in said hydrocarbon and that will impart a fluorescence thereto.

5. The product which comprises a liquid hydrocarbon and a naphthenate of an acridine color base that is soluble in aliphatic and aromatic hydrocarbons and will impart a fluorescence thereto.

6. The product which comprises a liquid hydrocarbon and a naphthenate of phosphine M that is soluble in aliphatic and aromatic hydrocarbons and will impart a fluorescence thereto.

7. The product which comprises a liquid hydrocarbon and a naphthenate of acridine orange that is soluble in aliphatic and aromatic hydrocarbons and will impart a fluorescence thereto.

8. The product which comprises a liquid hydrocarbon and a naphthenate of 3:6 tetramethyl diamino-9-phenyl acridine.

9. The product which comprises a liquid hydrocarbon and a naphthenate of 3:6:13 hexamethyl triamino-9-phenyl-10 methyl acridine.

10. The process which consists in heating ten parts of naphthenic acid and one part of phosphine M base to 120° C. for a period of about five hours, and then diluting the same with an aliphatic hydrocarbon in the presence of heat and vigorous agitation.

This specification signed this 18th day of February, 1930.

THOMAS A. CASSIDY.

CERTIFICATE OF CORRECTION.

Patent No. 1,860,850.                                              May 31, 1932.

THOMAS A. CASSIDY.

It is hereby certified that the name of the first mentioned assignee in the above numbered patent was erroneously described and specified as "Frank J. Busser" whereas said name should have been described and specified as Frank S. Busser, as shown by the records of assignments in this office ; and that the said Letters Patent should be read with this correction therein that the same may conform to the record of the case in the Patent Office.

Signed and sealed this 4th day of October, A. D. 1932.

(Seal)

M. J. Moore,
Acting Commissioner of Patents.